Aug. 4, 1931.   B. PRIVAT   1,816,868
MOWER CONSTRUCTION
Filed Sept. 15, 1928   2 Sheets-Sheet 2
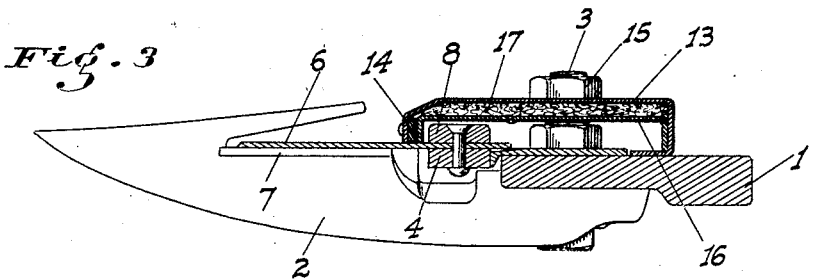
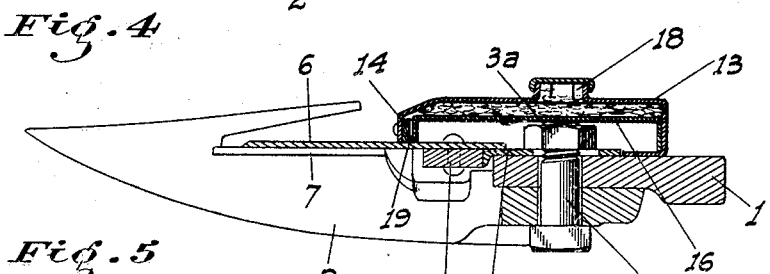
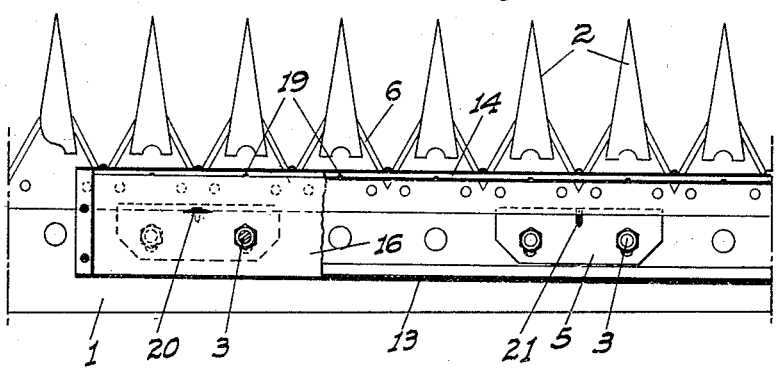
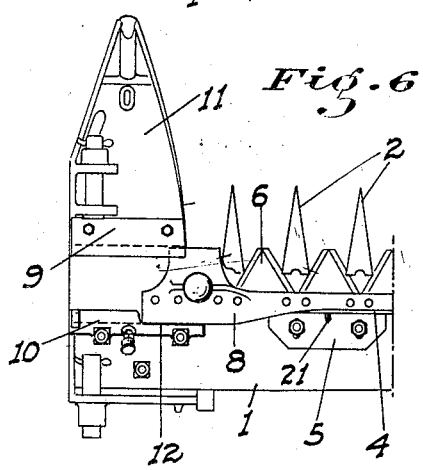
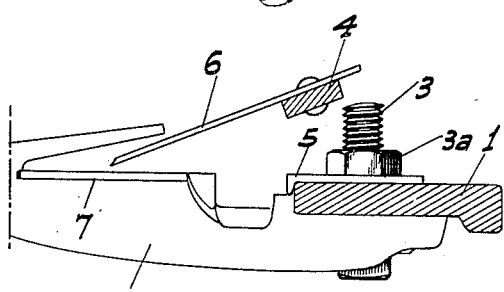
INVENTOR
*Bernard Privat*
BY
ATTORNEY Patented Aug. 4, 1931

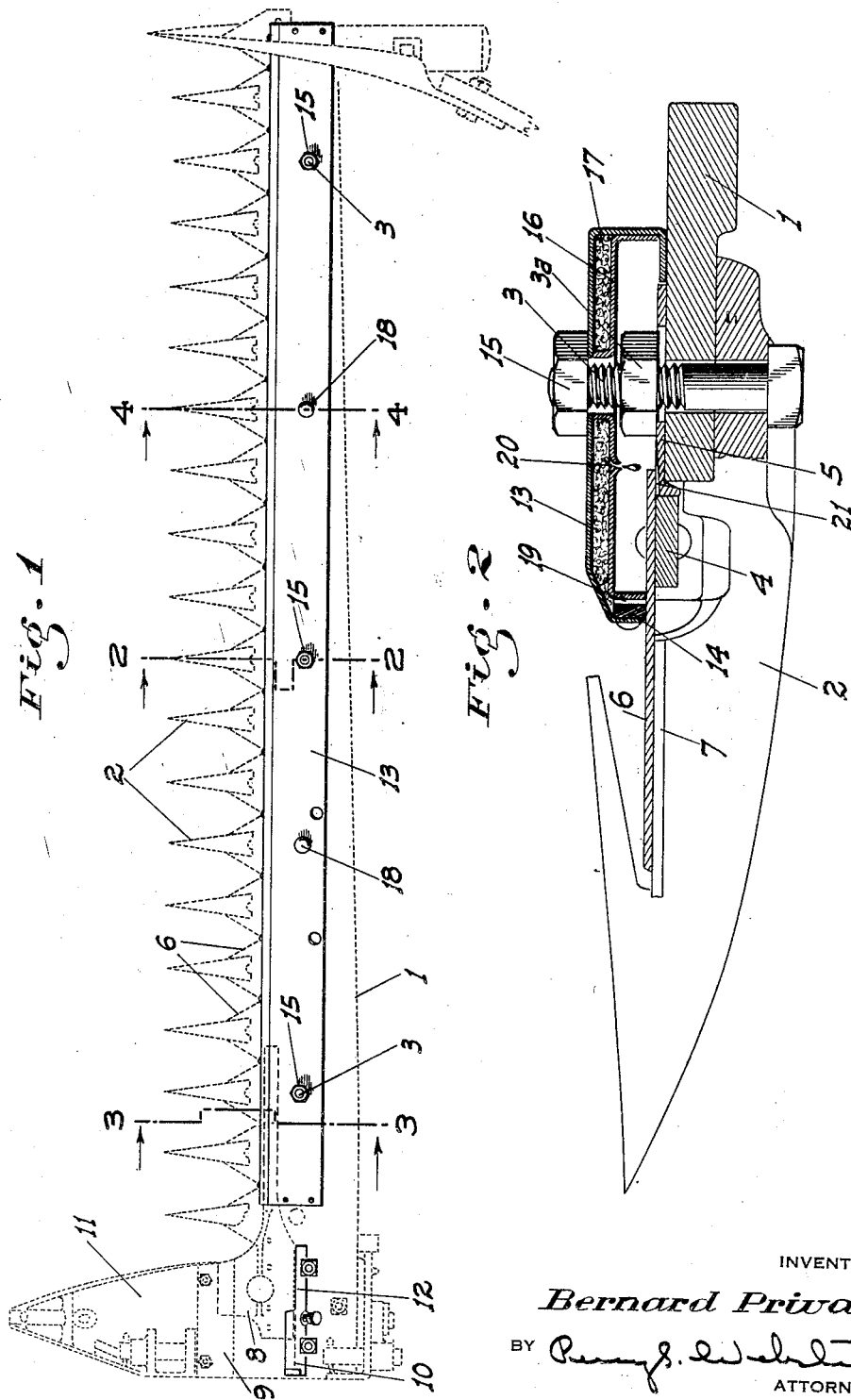

1,816,868

UNITED STATES PATENT OFFICE

BERNARD PRIVAT, OF STOCKTON, CALIFORNIA

MOWER CONSTRUCTION

Application filed September 15, 1928. Serial No. 306,177.

This invention relates to improvements in mower construction and particularly to a means for holding the reciprocating sickle bar in place.

The principal objects of my invention are to provide a structure for the purpose so arranged that the bar will be held down with a proper and even pressure throughout its entire extent; one which may be easily removed so as to enable the bar to be removed without sliding the same endwise and clear of the finger bar as is now the case; one in which the guards are mounted on the cutter bar independent of the sickle bar holding means so that true alinement and even pressure of the knives on the guard plates is obtained; which is so constructed that grass and the like cannot lodge between the parts as is the case with the ordinary clips; one which is so constructed as to enable the moving and contacting surfaces of the finger and sickle bars to be maintained in a properly lubricated condition without the possibility of hay, etc. contacting with the lubricant and so that such wearing surfaces and lubricant are protected from the dust and water at all times; and one which may be easily applied to a standard mower without material alterations being necessary.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a top plan outline of a mower structure showing my improved sickle bar holding means mounted in connection therewith.

Fig. 2 is an enlarged cross section taken on the line 2—2 of Fig. 1.

Fig. 3 is a similar view taken on the line 3—3 of Fig. 1.

Fig. 4 is a similar view taken on the line 4—4 of Fig. 1.

Fig. 5 is a fragmentary plan view of the structure in section.

Fig. 6 is a fragmentary top plan showing the holding member and the sickle bar in position to be removed.

Fig. 7 is a fragmentary cross section illustrating the direction of movement of the sickle bar to remove the same.

Referring now more particularly to the characters of reference on the drawings, the numeral 1 denotes the finger bar of a standard mower, from which the usual guards 2 project, said guards being secured to the bar by bolts 3. The sickle or knife bar 4 operates in front of the finger bar and bears against the vertical edges of wearing plates 5 which rest on the finger bar and are held in place by the nuts 3a of the bolts 3. The triangular knives 6 are riveted on the sickle bar and project forwardly therefrom to cooperate with the guard plates or fixed cutters 7.

The knife-head 8 is attached to the sickle bar at its inner end, and is slidable at its outer end between a guide plate 9 engaging its forward side, and a knife-head cap 10 engaging its rear side; said cap and plate being secured on the shoe 11 to which the finger bar is secured.

I contemplate removing the sickle bar by a direct rearward movement accompanied by an upward tilt to the rear, instead of having to draw the sickle bar horizontally for the full length of the finger bar as must now be done. To this end I shift the sickle bar lengthwise beyond its normal stroke position in the direction of the outer end of the mower when the pitman is disconnected, until the knives assume positions intermediate the guards as shown in Fig. 6. The outer end of the overhanging cap flange of the member 10 is cut away as at 12 to a length sufficient to avoid the adjacent end of the knife-head when the latter is in such shifted position, which permits said knife-head and consequently the sickle bar to be tilted clear of the cap and then drawn rearwardly.

The parts so far described except for the special or cutaway cap are standard and are not changed.

The means to hold the sickle bar in place and replacing the usual clips, comprises a housing 13 of essentially inverted channel form and of resilient metal. The rear end of this housing is formed with a longitudinal and inturned flange at its bottom which rests on the finger bar rearwardly of the wearing plates; while the forward lower edge of the housing rests on the knives just in front of the sickle bar. This edge of the channel is reinforced by a longitudinal bar 14 also resting on the knives. The housing is continuous from end to end of the sickle bar and is removably held in place by nuts 15 on certain ones of the bolts 3, which bolts extend the necessary distance above the plate holding nuts 3a. Since three of these nuts 15 are sufficient to hold the housing securely in place, it will be seen that it is very easy to remove said housing, which removal permits the sickle bar to be removed in the manner previously stated. It will also be seen that the housing being a continuous and unbroken element from end to end, there are no pockets or crevices for collecting grass, etc. Also it will be evident that the contacting surfaces of the sickle bar and wearing plates are completely enclosed and protected from exposure to dirt and the elements. Further, the knives being engaged by the continuous forward edge of the housing, the pressure of the knives against the guard plates is even and constant at all times; the resiliency of the housing preventing undue or binding pressure being had and enabling the knives to be held down evenly and lightly against the guard plates. The guards being mounted independently of the sickle bar retaining means, the alinement of the guards is not disturbed when the housing is removed; and proper cooperating alinement of the parts at all times is assured.

Mounted in the housing and extending for the full width and length thereof is a plate 16 which is spaced from the top of the housing to form a chamber for the reception of suitable lubricant retaining or absorbing material 17. Filler tubes 18 for the lubricant are provided at suitable points in the top of the housing. The lubricant is fed to the necessary moving or wearing surfaces by means of vertical passages 19 provided in the back edge of the bar 14 to lubricate the area of contact of the said bar with the knives; and by bleed slits 20 provided in the plate 16 above the wearing plates, so that the lubricant will drop thereon, said plates being provided with grooves 21 in their upper surfaces leading to the bar contacting faces thereof. The above arrangement as will be evident provides for the ample and protected lubrication of all wearing surfaces, so that the parts will work freely and give satisfactory service without repairs or replacements for a long period of time.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a mower having a finger bar, a sickle bar slidably cooperating therewith, knives mounted on the sickle bar, and a knife-head secured to and projecting beyond one end of the sickle bar; a knife-head cap mounted in connection with the finger bar and engaging the rear side edge of the head and having a longitudinal flange overhanging the head, said flange being cut away from its end adjacent the sickle bar to an extent sufficient to clear the outer end of the head when the sickle bar is shifted longitudinally a predetermined distance beyond its normal limit of operation whereby said head may then be tilted upwardly along its rear edge and moved rearwardly clear of the cap, and removable means mounted on the finger bar and normally engaging the knives.

2. In a mower having a finger bar, a sickle bar slidably cooperating therewith, knives mounted on the sickle bar, and a knife-head secured to and projecting beyond one end of the sickle bar; a knife-head cap mounted in connection with the finger bar and engaging the rear side edge of the head and having a longitudinal flange overhanging the head, said flange being cut away from its end adjacent the sickle bar to an extent sufficient to clear the outer end of the head when the sickle bar is shifted longitudinally a predetermined distance beyond its normal limit of operation whereby said head may then be tilted upwardly along its rear edge and moved rearwardly clear of the cap, and removable means mounted on the finger bar and preventing upward movement of the sickle bar irrespective of the positioning of the head relative to the cap.

In testimony whereof I affix my signature.

BERNARD PRIVAT.